US012614727B2

(12) United States Patent
Yonemaru

(10) Patent No.: US 12,614,727 B2
(45) Date of Patent: Apr. 28, 2026

(54) METHOD OF PRODUCING ELECTRODE FOR ELECTROCHEMICAL DEVICE, METHOD OF PRODUCING ELECTROCHEMICAL DEVICE, AND SHAPING MATERIAL FOR ELECTRODE

(71) Applicant: ZEON CORPORATION, Tokyo (JP)

(72) Inventor: Hiroyuki Yonemaru, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 455 days.

(21) Appl. No.: 17/593,862

(22) PCT Filed: Mar. 27, 2020

(86) PCT No.: PCT/JP2020/014311
§ 371 (c)(1),
(2) Date: Sep. 27, 2021

(87) PCT Pub. No.: WO2020/203883
PCT Pub. Date: Oct. 8, 2020

(65) Prior Publication Data
US 2022/0173398 A1 Jun. 2, 2022

(30) Foreign Application Priority Data
Mar. 29, 2019 (JP) ................................. 2019-068357

(51) Int. Cl.
| | |
|---|---|
| *H01M 4/04* | (2006.01) |
| *H01G 11/24* | (2013.01) |
| *H01G 11/86* | (2013.01) |
| *H01M 4/62* | (2006.01) |
| *H01M 50/443* | (2021.01) |

(52) U.S. Cl.
CPC .............. *H01M 4/62* (2013.01); *H01G 11/24* (2013.01); *H01G 11/86* (2013.01); *H01M 4/04* (2013.01); *H01M 50/443* (2021.01)

(58) Field of Classification Search
CPC ........ H01M 4/02; H01M 4/62; H01M 50/443; H01G 11/24; H01G 11/86
See application file for complete search history.

(56) References Cited

U.S. PATENT DOCUMENTS

| | | | |
|---|---|---|---|
| 4,830,939 A | 5/1989 | Lee et al. | |
| 5,061,581 A | 10/1991 | Narang et al. | |
| 8,052,888 B2 | 11/2011 | Yoshino et al. | |
| 2003/0031782 A1* | 2/2003 | Sayama | H01M 4/38 427/58 |
| 2003/0180611 A1* | 9/2003 | Mikhaylik | H01M 10/0567 429/231.95 |
| 2003/0215710 A1 | 11/2003 | Lavoie et al. | |
| 2006/0154147 A1* | 7/2006 | Kurihara | H01M 4/587 252/182.1 |
| 2006/0263688 A1 | 11/2006 | Guyomard et al. | |
| 2013/0284988 A1* | 10/2013 | Satake | H01G 11/06 252/518.1 |
| 2015/0096169 A1* | 4/2015 | Hasegawa | H01M 4/139 427/126.3 |
| 2015/0263387 A1* | 9/2015 | Onoue | H01M 10/44 429/339 |
| 2016/0164135 A1 | 6/2016 | Fasching et al. | |

FOREIGN PATENT DOCUMENTS

| | | | | |
|---|---|---|---|---|
| EP | 0318161 A1 | 5/1989 | | |
| JP | H02602 A | 1/1990 | | |
| JP | H04506983 A | 12/1992 | | |
| JP | 2004134365 A | * 4/2004 | .............. | H01M 4/62 |
| JP | 2005519442 A | 6/2005 | | |
| JP | 2006522441 A | 9/2006 | | |
| JP | 2007323872 A | 12/2007 | | |
| JP | 2017107653 A | 6/2017 | | |
| JP | 2018503220 A | 2/2018 | | |
| JP | 2018092857 A | 6/2018 | | |
| KR | 0131460 B1 | 4/1998 | | |
| KR | 2017-0031600 | * 3/2017 | | |
| WO | 2008032679 A1 | 3/2008 | | |
| WO | 2015151144 A1 | 10/2015 | | |
| WO | 2018183771 A1 | 10/2018 | | |

OTHER PUBLICATIONS

Machine Translation JP2004134365A (Year: 2004).*
Sep. 28, 2021, International Preliminary Report on Patentability issued in the International Patent Application No. PCT/JP2020/014311.
Jun. 16, 2020, International Search Report issued in the International Patent Application No. PCT/JP2020/014311.

* cited by examiner

*Primary Examiner* — Osei K Amponsah
(74) *Attorney, Agent, or Firm* — KENJA IP LAW PC

(57) ABSTRACT

Provided is a method of producing an electrode for an electrochemical device in which problems of corrosion of production equipment and odor have a low tendency to occur. The method of producing an electrode for an electrochemical device includes a step of forming an electrode including a composite layer having a porosity of 10 volume % or less using a shaping material for an electrode that contains an active material and an ion conductor having an ion conductivity at a temperature of 5° C. of $10^{-4}$ S/cm or less. The ion conductor includes a low molecular weight organic compound having a molecular weight of less than 10,000. The proportion constituted by a compound having an equal or higher volatilization rate than N-methylpyrrolidone among the low molecular weight organic compound is not less than 0 mass % and not more than 20 mass %.

8 Claims, No Drawings

METHOD OF PRODUCING ELECTRODE FOR ELECTROCHEMICAL DEVICE, METHOD OF PRODUCING ELECTROCHEMICAL DEVICE, AND SHAPING MATERIAL FOR ELECTRODE

TECHNICAL FIELD

The present disclosure relates to a method of producing an electrode for an electrochemical device, a method of producing an electrochemical device, and a shaping material for an electrode.

BACKGROUND

Electrodes containing active materials are used in electrochemical devices such as primary batteries (lithium primary batteries, etc.), non-aqueous secondary batteries (lithium ion secondary batteries, lithium metal secondary batteries, sodium ion secondary batteries, potassium ion secondary batteries, magnesium secondary batteries, aluminum secondary batteries, etc.), solar cells (dye-sensitized solar cells, etc.), capacitors (electric double-layer capacitors, lithium ion capacitors, etc.), electrochromic display devices, electrochemical light-emitting elements, electric double-layer transistors, and electrochemical actuators.

For example, in Patent Literature (PTL) 1, a positive electrode for an alkali metal polymer battery that includes a positive electrode film on metal foil is produced by using a screw extruder to mix an ion conducting polymer electrolyte material such as polyethylene oxide, a cathode active material such as vanadium oxide, a conductive filler such as carbon and graphite particles, a lithium salt, and a plasticizer and to extrude the mixture onto the metal foil.

As another example, a positive electrode for a lithium battery that includes an electrode film on aluminum foil is produced in PTL 2 by applying a viscous solution containing polyethylene oxide, carbon, $LiV_3O_8$, ethylene carbonate, propylene carbonate, a PVdF-HFP copolymer (copolymer of polyvinylidene fluoride and hexafluoropropylene), and acrylonitrile onto the aluminum foil and subsequently causing evaporation of acrylonitrile.

CITATION LIST

Patent Literature

PTL 1: JP2005-519442A
PTL 2: JP2006-522441A

SUMMARY

Technical Problem

However, a problem of corrosion of metal parts of production equipment occurs with the technique described in PTL 1 because a lithium salt is contained in ingredients of the positive electrode film.

The technique described in PTL 2 is also problematic in terms that a large amount of a volatile solvent such as acrylonitrile is volatilized during formation of the electrode film, which may result in problems such as odor.

Accordingly, one object of the present disclosure is to provide a method of producing an electrode for an electrochemical device in which problems of corrosion of production equipment and odor have a low tendency to occur and also to provide a method of producing an electrochemical device using an electrode produced by the aforementioned production method.

Another object of the present disclosure is to provide a shaping material for an electrode that can inhibit the occurrence of problems of corrosion of production equipment and odor when used to produce an electrode.

Solution to Problem

As a result of diligent investigation conducted to achieve the objects set forth above, the inventor discovered that it is possible to produce an electrode while inhibiting the occurrence of problems of corrosion of production equipment and odor by using a shaping material for an electrode that contains a specific ion conductor, and, in this manner, completed the present disclosure.

Specifically, the present disclosure aims to advantageously solve the problems set forth above, and a presently disclosed method of producing an electrode for an electrochemical device comprises a step of forming an electrode including a composite layer having a porosity of 10 volume % or less using a shaping material for an electrode that contains an active material and an ion conductor having an ion conductivity at a temperature of 5° C. of $10^{-4}$ S/cm or less, wherein the ion conductor includes a low molecular weight organic compound having a molecular weight of less than 10,000, and a proportion constituted by a compound having an equal or higher volatilization rate than N-methylpyrrolidone among the low molecular weight organic compound is not less than 0 mass % and not more than 20 mass %. By producing an electrode using a shaping material for an electrode that contains an ion conductor having an ion conductivity of not more than the upper limit set forth above in this manner, corrosion of production equipment can be inhibited. Moreover, through the proportion constituted by a compound having an equal or higher volatilization rate than N-methylpyrrolidone among the low molecular weight organic compound being 20 mass % or less, the occurrence of a problem of odor during production can be inhibited.

Note that the "ion conductivity" referred to in the present disclosure is ion conductivity measured by an alternating current method and can be determined as the reciprocal of volume resistivity calculated from the arc diameter of a Nyquist plot that is obtained by sandwiching a sample between two parallel electrode plates made of stainless steel inside a thermostatic tank controlled to the measurement temperature ±1° C. and then applying alternating current within a range of 10 mV to 100 mV. Also note that the "volatilization rate" can be measured at a temperature of 18° C. by a method described in a reference example. Moreover, the "porosity" can be determined by calculating the proportion by which actual specific gravity deviates from theoretical specific gravity at a temperature of 25° C. (={(theoretical specific gravity–actual specific gravity)/theoretical specific gravity}×100%).

In the presently disclosed method of producing an electrode for an electrochemical device, the ion conductor is preferably a viscous composition containing a polymer in a proportion of 50 mass % or less. When the proportional content of the polymer in the ion conductor is 50 mass % or less, this can make the shaping material for an electrode easy to produce and the proportional content of the active material therein easy to improve.

In the presently disclosed method of producing an electrode for an electrochemical device, the ion conductor preferably does not include an ionic material. When the ion conductor does not include an ionic material, corrosion of production equipment can be further inhibited.

In the presently disclosed method of producing an electrode for an electrochemical device, forming of the shaping material for an electrode is preferably performed to form the composite layer in the step. By performing forming of the shaping material for an electrode, the shape of the composite layer can easily be adjusted to a desired shape.

Moreover, the present disclosure aims to advantageously solve the problems set forth above, and a presently disclosed method of producing an electrochemical device comprises: a step (A) of producing either or both of a positive electrode and a negative electrode using the method of producing an electrode for an electrochemical device; and a step (B) of bringing an electrode produced in the step (A) and a separator containing an ion source into contact. By bringing an electrode that is produced using the presently disclosed method of producing an electrode for an electrochemical device and a separator that contains an ion source into contact, it is possible to supply ions to a composite layer of the electrode during production of an electrochemical device even when a shaping material for an electrode that contains an ion conductor having an ion conductivity of not more than a specific value is used so as to inhibit corrosion of production equipment during electrode production.

Furthermore, the present disclosure aims to advantageously solve the problems set forth above, and a presently disclosed shaping material for an electrode comprises: an active material; and an ion conductor having an ion conductivity at a temperature of 5° C. of $10^{-4}$ S/cm or less, wherein the ion conductor includes a low molecular weight organic compound having a molecular weight of less than 10,000, and a proportion constituted by a compound having an equal or higher volatilization rate than N-methylpyrrolidone among the low molecular weight organic compound is not less than 0 mass % and not more than 20 mass %. By setting the ion conductivity of the ion conductor as not more than the upper limit set forth above, corrosion of production equipment during production of an electrode using the ion conductor can be inhibited. Moreover, through the proportion constituted by a compound having an equal or higher volatilization rate than N-methylpyrrolidone among the low molecular weight organic compound being 20 mass % or less, the occurrence of a problem of odor during electrode production can be inhibited.

In the presently disclosed shaping material for an electrode, the ion conductor is preferably a viscous composition containing a polymer in a proportion of 50 mass % or less. When the proportional content of a polymer in the ion conductor is 50 mass % or less, the obtained shaping material for an electrode is easy to produce and the proportional content of the active material therein is easy to improve.

In the presently disclosed shaping material for an electrode, the ion conductor preferably does not include an ionic material. When the ion conductor does not include an ionic material, corrosion of production equipment can be further inhibited.

Advantageous Effect

According to the present disclosure, it is possible to provide a method of producing an electrode for an electrochemical device in which problems of corrosion of production equipment and odor have a low tendency to occur and also to provide a method of producing an electrochemical device using an electrode produced by the aforementioned production method.

Moreover, according to the present disclosure, it is possible to provide a shaping material for an electrode that can inhibit the occurrence of problems of corrosion of production equipment and odor when used to produce an electrode.

DETAILED DESCRIPTION

The presently disclosed method of producing an electrode for an electrochemical device can be used without any specific limitations in production of an electrode of an electrochemical device such as a primary battery (lithium primary battery, etc.), a non-aqueous secondary battery (lithium ion secondary battery, lithium metal secondary battery, sodium ion secondary battery, potassium ion secondary battery, magnesium secondary battery, aluminum secondary battery, etc.), a solar cell (dye-sensitized solar cell, etc.), a capacitor (electric double-layer capacitor, lithium ion capacitor, etc.), an electrochromic display device, an electrochemical light-emitting element, an electric double-layer transistor, or an electrochemical actuator, for example. Moreover, in the presently disclosed method of producing an electrode for an electrochemical device, the presently disclosed shaping material for an electrode is used to produce an electrode.

Furthermore, the presently disclosed method of producing an electrochemical device is used in production of an electrochemical device using an electrode produced in accordance with the presently disclosed method of producing an electrode for an electrochemical device.

Note that the aforementioned electrochemical device is preferably a non-aqueous secondary battery, and is more preferably a lithium ion secondary battery.

(Shaping Material for Electrode)

The presently disclosed shaping material for an electrode contains an active material and an ion conductor having an ion conductivity at a temperature of 5° C. of $10^{-4}$ S/cm or less. The ion conductor includes a low molecular weight organic compound having a molecular weight of less than 10,000 and can optionally further include a polymer. Moreover, the shaping material for an electrode can optionally further contain one or more selected from the group consisting of a conductive filler, a fiber component, and an additive.

<Active Material>

Any active material in accordance with the type of electrochemical device can be used as the active material without any specific limitations. The active material contained in the shaping material for an electrode may be composed of just one active material or may be a mixture of two or more active materials.

In particular, the active material is preferably an active material of a nanosize (maximum diameter of less than 1 μm), and is more preferably an active material having a volume-average particle diameter of not less than 100 nm and not more than 900 nm. The use of a nanosize active material increases contact interface area with the ion conductor, which makes it possible to form an electrode having excellent strength and to form an electrode that can cause good progression of an electrochemical reaction.

Note that the volume-average particle diameter of an active material referred to in the present disclosure can be measured in accordance with JIS K8825.

The proportional content of the active material in the shaping material for an electrode is preferably 50 volume % or more, and more preferably 60 volume % or more. When the proportional content of the active material is not less than any of the lower limits set forth above, it is possible to form an electrode that enables production of a high-capacity electrochemical device.

<Ion Conductor>

The ion conductor is a material having the ability to transport ions. The ion conductor includes a low molecular weight organic compound having a molecular weight of less than 10,000 and optionally further includes a polymer. The ion conductor is required to have an ion conductivity at a temperature of 5° C. of $10^{-4}$ S/cm or less. When the ion conductivity at a temperature of 5° C. is not more than the upper limit set forth above in this manner, the content of a salt or the like that may act as a cause of corrosion of production equipment used in electrode production can be sufficiently reduced, and thus corrosion of production equipment can be sufficiently inhibited.

Note that the ion conductor preferably does not include an ionic material. When an ionic material is not included, corrosion of production equipment used in electrode production can be inhibited, and importation of moisture due to hygroscopicity can be prevented. Moreover, when an ionic material is not included, electrode shaping conditions can be set without being influenced by decomposition or the like of an ionic material.

[Low Molecular Weight Organic Compound having Molecular Weight of Less than 10,000]

The low molecular weight organic compound having a molecular weight of less than 10,000 includes 80 mass % or more of a compound having a lower volatilization rate than N-methylpyrrolidone (hereinafter, also referred to as a "low volatilization rate compound") and optionally includes a compound having an equal or higher volatilization rate than N-methylpyrrolidone (hereinafter, also referred to as a "high volatilization rate compound") in a proportion of not less than 0 mass % and not more than 20 mass %.

When the proportion constituted by a high volatilization rate compound among the low molecular weight organic compound is 20 mass % or less, this can reduce the amount of a component that is volatilized during electrode formation and can inhibit the occurrence of a problem of odor.

The proportional content of the low molecular weight organic compound in the ion conductor is normally 50 mass % or more, and preferably 70 mass % or more, and is preferably 99 mass % or less, and more preferably 97 mass % or less. Setting the proportional content of the low molecular weight organic compound as not less than any of the lower limits set forth above makes the shaping material for an electrode easier to produce. Moreover, setting the proportional content of the low molecular weight organic compound as not more than any of the upper limits set forth above can facilitate electrode formation using the shaping material for an electrode.

{Low Volatilization Rate Compound}

Examples of the low volatilization rate compound include, but are not specifically limited to, tris(ethylhexyl) phosphate, adiponitrile, 1,3-propane sultone, glutaric anhydride, succinic anhydride, succinonitrile, tributyl phosphate, tetraglyme, diglycolic anhydride, sulfolane, ethyl methyl sulfone, dimethyl sulfone, tris(butoxyethyl) phosphate, sulfolene, diethyl sulfone, ethylene sulfate (1,3,2-dioxathiolane-2,2-dioxide), vinyl ethylene carbonate, ethylene carbonate, N-methyloxazolidone, propylene carbonate, fluoroethylene carbonate, triglyme, triethyl phosphate, citraconic anhydride, methyl carbamate, and dimethylimidazolidinone. Of these examples, organic compounds having a higher volatilization rate than triethyl phosphate, such as tris(ethylhexyl) phosphate, adiponitrile, 1,3-propane sultone, glutaric anhydride, succinic anhydride, succinonitrile, tributyl phosphate, tetraglyme, diglycolic anhydride, sulfolane, ethyl methyl sulfone, dimethyl sulfone, tris(butoxyethyl) phosphate, sulfolene, diethyl sulfone, ethylene sulfate (1,3,2-dioxathiolane-2,2-dioxide), vinyl ethylene carbonate, ethylene carbonate, N-methyloxazolidone, propylene carbonate, fluoroethylene carbonate, and triglyme, are preferable from a viewpoint of further reducing the amount of a component that volatilizes during electrode formation, and organic compounds having a higher volatilization rate than propylene carbonate, such as tris(ethylhexyl) phosphate, adiponitrile, 1,3-propane sultone, glutaric anhydride, succinic anhydride, succinonitrile, tributyl phosphate, tetraglyme, diglycolic anhydride, sulfolane, ethyl methyl sulfone, dimethyl sulfone, tris(butoxyethyl) phosphate, sulfolene, diethyl sulfone, ethylene sulfate (1,3,2-dioxathiolane-2,2-dioxide), vinyl ethylene carbonate, ethylene carbonate, and N-methyloxazolidone, are more preferable.

One of the organic compounds described above may be used individually, or two or more of the organic compounds described above may be used together. In particular, from a viewpoint of reducing the amount of a component that volatilizes during electrode formation while also improving solubility of a polymer or the like, it is preferable to use two or more of the above-described organic compounds together as the low volatilization rate compound, and more preferable to use three or more of the above-described organic compounds together as the low volatilization rate compound.

The proportion constituted by the low volatilization rate compound among the low molecular weight organic compound is not specifically limited so long as it is 80 mass % or more, but is preferably 90 mass % or more.

{High Volatilization Rate Compound}

Examples of the high volatilization rate compound include, but are not specifically limited to, N-methylpyrrolidone, γ-butyrolactone, dimethyl oxalate, vinylene carbonate, dimethyl sulfoxide, trimethyl phosphate, dimethyl carbonate, diethyl carbonate, ethyl methyl carbonate, ethyl acetate, ethyl propionate, and propyl propionate. Of these examples, organic compounds having an equal or higher volatilization rate than trimethyl phosphate, such as N-methylpyrrolidone, γ-butyrolactone, dimethyl oxalate, vinylene carbonate, dimethyl sulfoxide, and trimethyl phosphate, are preferable from a viewpoint of reducing the amount of volatilization during electrode formation.

One of the organic compounds described above may be used individually, or two or more of the organic compounds described above may be used together.

The proportion constituted by the high volatilization rate compound among the low molecular weight organic compound is not specifically limited so long as it is not less than 0 mass % and not more than 20 mass %, but is preferably 10 mass % or less.

Note that in the low molecular weight organic compound, the proportional content of a compound that is a liquid at a temperature of 5° C. under atmospheric pressure is preferably not less than 0 mass % and not more than 20 mass %, and more preferably 10 mass % or less. When the proportional content of a compound that is a liquid at a temperature of 5° C. under atmospheric pressure is not more than any of the upper limits set forth above, it is possible to obtain a shaping material for an electrode that is difficult to combust and to inhibit mechanical failure or the like being brought about by a volatilized compound becoming attached as a liquid in the surroundings.

Examples of the compound that is a liquid at a temperature of 5° C. under atmospheric pressure include, but are not specifically limited to, tris(ethylhexyl) phosphate, adiponitrile, 1,3-propane sultone, tributyl phosphate, tetraglyme, tris(butoxyethyl) phosphate, vinyl ethylene carbonate, propylene carbonate, triglyme, triethyl phosphate, citraconic anhydride, N-methylpyrrolidone, γ-butyrolactone, trimethyl phosphate, dimethyl carbonate, diethyl carbonate, ethyl methyl carbonate, ethyl acetate, ethyl propionate, and propyl propionate.

[Polymer]

Polymers such as a polyether polymer, an acrylic polymer, a polyacrylonitrile polymer, a polyoxazoline polymer, and an aliphatic polycarbonate polymer, for example, can be used as the polymer that is an optional component without any specific limitations. Specifically, the polymer may be polyethylene oxide, an ethylene oxide copolymer, a side chain ethylene oxide polymer, hydrin rubber, polyvinyl acetate, a vinyl chloride-vinyl acetate copolymer, polyoxazoline, a side chain oxazoline copolymer, polyacrylonitrile, nitrile rubber, an acrylic acid ester copolymer, polymethyl methacrylate, a styrene-acrylate copolymer, or acrylic rubber. One of these polymers may be used individually, or two or more of these polymers may be used together.

The weight-average molecular weight of the polymer as measured in accordance with JIS K7252 is preferably 10,000 or more, and is more preferably not less than 100,000 and not more than 30,000,000. Note that the polymer is not inclusive of a material that becomes a polymer through polymerization inside an electrochemical device.

In particular, the polymer is preferably a polymer that dissolves in the low molecular weight organic compound. Specifically, the polymer is preferably a polymer that when added to the low molecular weight organic compound, causes an increase of viscosity of the low molecular weight organic compound. Note that in a case in which the low molecular weight organic compound is a solid at room temperature, it is possible to determine whether viscosity is increased by heating the low molecular weight organic compound until it is a liquid and then adding the polymer thereto.

From a viewpoint of dissolving well in the ion conductor, the polymer preferably has low gel content. The gel content is preferably 20 mass % or less, more preferably 10 mass % or less, and even more preferably 5 mass % or less among the polymer. The gel content of the polymer can be determined by adding the polymer to propylene carbonate in a ratio of 5 mass %, dissolving the polymer under stirring at 100° C. for 12 hours, filtering off insoluble content at 100° C. using a membrane filter, vacuum drying the insoluble content to remove propylene carbonate, and measuring the residue weight.

The proportional content of the polymer in the ion conductor is preferably 1 mass % or more, and more preferably 3 mass % or more, and is preferably 50 mass % or less, and more preferably 30 mass % or less. When the proportional content of the polymer is not more than any of the upper limits set forth above, the active material and the ion conductor can be mixed well even in a situation in which the active material constitutes a high proportion (for example, 70 mass % or more) in the obtained shaping material for an electrode. Moreover, when the proportional content of the polymer is not less than any of the lower limits set forth above, this facilitates formation of an electrode using the shaping material for an electrode.

Note that in a case in which the ion conductor includes a polymer, the ion conductor is preferably a viscous composition.

[Ionic Material]

In a case in which an ionic material is included, any ionic material in accordance with the type of ion that is used in an electrochemical reaction in an electrochemical device can be used as the ionic material.

Note that the ionic material is preferably a material that is miscible with the low molecular weight organic compound and the polymer.

The ionic material is preferably a material that is strongly resistant to moisture. Moreover, the ionic material is preferably a salt having a bis(fluorosulfonyl)imide anion, a bis(trifluoromethanesulfonyl)imide anion, a bis(oxalato)borate anion, a difluoro(oxalato)borate anion, $ClO_4^-$, $NO_3^-$, $BF_4^-$, $I^-$, $I_3^-$, or the like as an anion, and more preferably a salt having a bis(oxalato)borate anion or a difluoro(oxalato) borate anion as an anion, but is not specifically limited thereto.

More specifically, in a case in which the electrochemical device is a lithium ion secondary battery, a lithium ion capacitor, or the like, a lithium salt of any of the anions described above can be used as the ionic material. Moreover, in a case in which the electrochemical device is a magnesium secondary battery or the like, a magnesium salt of any of the anions described above can be used as the ionic material.

One of these ionic materials may be used individually, or two or more of these ionic materials may be used together.

The proportional content of the ionic material in the ion conductor is preferably 0.1 mass % or less, for example.

[Properties of Ion Conductor]

The ion conductor preferably has the following properties but is not specifically limited to having these properties.

{Viscosity}

It is preferable that components contained in the ion conductor are miscible, and more preferable that the ion conductor is a liquid at a temperature of 35° C. under atmospheric pressure. The viscosity of the ion conductor at a temperature of 25° C. is preferably 10 mPa·s or more, more preferably 20 mPa·s, and even more preferably 50 mPa·s or more.

Note that the "viscosity" referred to in the present disclosure is the viscosity at a temperature of 25° C. measured at a motor speed of 1,000 rpm using an EMS viscometer (EMS-1000S produced by Kyoto Electronics Manufacturing Co., Ltd.) under hermetically sealed conditions such that volatilization of organic composition and mixing in of moisture from air do not occur. Also note that viscosity measured by this measurement method is fundamentally the same value as a value measured in accordance with JIS Z8803. The viscosity of the ion conductor can be adjusted by altering the chemical composition of the ion conductor. Specifically, the viscosity of the ion conductor can be increased by compounding a high-viscosity compound, for example.

In a situation in which one wishes to determine the chemical composition at which a liquid is formed when a solid compound is mixed, this can be determined by mixing equal amounts of all compounds used in the composition, heating the overall mixture to at least the melting point of a compound having a highest melting point among these compounds to cause melting, and then performing cooling to the temperature at which the composition is to be used as a liquid. In a case in which the overall mixture is a liquid at that point, the mixture can be used as the composition in that form, and in a case in which some of the mixture is a solid, the chemical composition at which a liquid state is displayed can be determined by quantifying the chemical composition of the supernatant in a gas chromatograph or a liquid chromatograph.

<Conductive Filler>

Any conductive filler that can be used in the field of electrochemical devices, such as acetylene black, Ketjenblack, graphite, or graphene, and particularly any particulate conductive filler can be used as the conductive filler that is an optional component without any specific limitations. The inclusion of a conductive filler makes it possible to form an electrode having excellent electrical conductivity.

The proportional content of the conductive filler in the shaping material for an electrode per 100 parts by mass of the ion conductor is preferably 5 parts by mass or more, and more preferably 10 parts by mass or more, and is preferably 100 parts by mass or less, and more preferably 70 parts by mass or less. When the proportional content of the conductive filler is not less than any of the lower limits set forth above, the electrical conductivity of an electrode can be sufficiently increased. Moreover, when the proportional content of the conductive filler is not more than any of the upper limits set forth above, it is possible to prevent mixing becoming difficult and production of the shaping material for an electrode becoming difficult.

<Fiber Component>

The fiber component that is an optional component is preferably a fiber component having a fiber diameter that is of a nanosize (maximum diameter of less than 1 μm), and more preferably a fiber component having an average fiber diameter of not less than 0.4 nm and not more than 500 nm, but is not specifically limited thereto. Compounding a fiber component having a nanosize fiber diameter aids cohesion of components contained in the shaping material for an electrode and makes it possible to form an electrode having excellent strength. Note that the fiber diameter can be measured using a microscope such as a scanning electron microscope or a transmission electron microscope. Although the fiber diameter may be of a nanosize prior to compounding or may be of a nanosize after kneading as the shaping material for an electrode, it is important that bridges having a nanosize diameter are formed between particles of the active material. When an electrode is observed under a microscope, it is preferable that 10 or more bridges are present, and more preferable that 20 or more bridges are present in a 100 μm-square field of view. In a situation in which the electrode is unsuitable for observation due to the presence of a volatile organic compound, the electrode is preferably observed after drying.

Examples of the fiber component having a nanosize fiber diameter include, but are not specifically limited to, carbon nanotubes, carbon nanofiber, cellulose nanofiber, and PTFE (polytetrafluoroethylene) nanofiber.

Although no specific limitations are placed on the amount of the fiber component, the amount of the fiber component per 100 parts by mass of the active material, for example, is preferably 8 parts by mass or less, more preferably 5 parts by mass or less, and even more preferably 3 parts by mass or less. When the content of the fiber component is not more than any of the upper limits set forth above, reduction of electrode density can be inhibited.

<Additive>

Any additive that can be used in the field of electrochemical devices, such as an electrode protectant or a flame retardant, can be used as the additive that is an optional component without any specific limitations.

Note that compounds having a low volatilization rate are preferable as the additive, compounds having a lower volatilization rate than triethyl phosphate are more preferable as the additive, and compounds having a lower volatilization rate than polycarbonate are even more preferable as the additive.

[Electrode Protectant]

Any electrode protectant that can be used in the field of electrochemical devices can be used as the electrode protectant without any specific limitations.

Specifically, examples of negative electrode protectants include fluoroethylene carbonate, vinylene carbonate, 1,3, 2-dioxathiolane-2,2-dioxide, 1,3-propane sultone, butane sultone, vinyl ethylene carbonate, and diallyl carbonate.

[Flame Retardant]

Examples of the flame retardant include phosphoric acid esters having a carbon number of 24 or less, phosphorous acid esters having a carbon number of 24 or less, and phosphazenes. Of these examples, the use of a phosphoric acid ester as the flame retardant is preferable.

Further examples of additives that can be used include whiskers, red phosphorus, aluminum hydroxide, magnesium hydroxide, antimony, cyclophosphazene oligomer, silica, alumina, zirconia, barium titanate, melamine, melamine cyanurate, ammonium carbonate, ammonium chloride, sodium bicarbonate, and oxybisbenzylhydrazide.

The proportional content of each additive in the shaping material for an electrode is not specifically limited but is normally 5 mass % or less.

<Physical Properties of Shaping Material for Electrode>

The shaping material for an electrode preferably has a clay-like or powdered form, and more preferably has a clay-like form.

Moreover, the porosity of the shaping material for an electrode is preferably 10 volume % or less, or becomes 10 volume % or less through compression. By using a shaping material for an electrode that has the porosity set forth above, it is possible to form a high-density electrode.

<Production of Shaping Material for Electrode>

The shaping material for an electrode can be produced by mixing the components described above in any order without any specific limitations.

Note that in a situation in which the shaping material for an electrode is not used soon after production, it is preferable that the shaping material for an electrode is stored in a hermetically sealed vessel or is stored with a protective film affixed in order to prevent volatilization of components contained in the shaping material for an electrode.

(Method of Producing Electrode for Electrochemical Device)

The presently disclosed method of producing an electrode for an electrochemical device can be used in production of an electrode that includes a composite layer formed using the presently disclosed shaping material for an electrode. In other words, an electrode produced in accordance with the presently disclosed method of producing an electrode for an electrochemical device may be composed of only the shaping material for an electrode or may be an electrode that includes a composite layer formed using the shaping material for an electrode on the surface of a current collector or the like. By using the presently disclosed shaping material for an electrode in this manner, it is possible to obtain an electrode having a high proportional content of an active material while also inhibiting the occurrence of problems of equipment corrosion and odor.

Note that in the electrode produced in accordance with the presently disclosed production method, a plurality of composite layers each formed using the shaping material for an electrode may be stacked. Also note that the plurality of stacked electrode shaping materials may have different chemical compositions to one another.

<Electrode>

More specifically, the electrode may, for example, be an electrode that is obtained through film formation of the presently disclosed shaping material for an electrode in any shape such as a sheet shape or an electrode that is obtained by affixing the shaping material for an electrode to a current collector. The thickness of the electrode may be uniform or may have a gradient. An electrode of which the thickness has a gradient can be produced, for example, through nipping using rolls having a different clearance at both ends thereof.

Note that since bonding is maintained only through physical affinity in the electrode, it is easier to maintain close adherence with an adherend such as a current collector in the case of a sheet shape that can easily copy the shape of the adherend.

In a case in which the shaping material for an electrode is affixed to a current collector, the shape of the shaping material for an electrode that is affixed can be any shape. Moreover, the shaping material for an electrode may be affixed to just one side of the current collector or may be affixed to both sides of the current collector.

The current collector preferably includes a through hole at a site where the shaping material for an electrode is affixed. When the current collector includes a through hole at a site where the shaping material for an electrode is affixed, the inside of the through hole becomes filled with the shaping material for an electrode, and thus the shaping material for an electrode can be affixed well. Moreover, when the current collector includes a through hole, this enables simple pre-doping by a perpendicular pre-doping method in a case in which an active material having initial irreversible capacity is used as the active material, for example.

The current collector preferably has a conductive coating at a surface that is in contact with the shaping material for an electrode. When the current collector has a conductive coating at a surface that is in contact with the shaping material for an electrode, electrical conductivity of the electrode can be increased, and close adherence with the shaping material for an electrode can be increased through surface irregularities. Note that any conductive coating that can be used in the field of electrochemical devices can be used as the conductive coating without any specific limitations.

The porosity of the composite layer that is formed using the shaping material for an electrode is required to be 10 volume % or less, and is preferably 5 volume % or less. When the porosity of a portion that is formed using the shaping material for an electrode is not more than any of the upper limits set forth above, it is possible to cause good progression of an electrochemical reaction in an electrochemical device. This also enables good supply of ions into the electrode during electrochemical device production.

In the composite layer that is formed using the shaping material for an electrode, the shaping material for an electrode is preferably cross-linked or polymerized. This is because cross-linking or polymerization of the shaping material for an electrode makes it possible to obtain an electrode having high strength.

The method by which the shaping material for an electrode is cross-linked or polymerized can be a known method such as heating or irradiation with ultraviolet light or electron beams without any specific limitations.

<Formation of Composite Layer>

Formation of the composite layer using the shaping material for an electrode can be performed by shaping the shaping material for an electrode in an open atmosphere, but is not specifically limited to being performed in this manner. The term "open atmosphere" refers to an atmosphere in which there is gas flow, an atmosphere that is being evacuated, or the like, where an atmosphere in contact with the shaping material for an electrode does not become saturated with vapor from the shaping material for an electrode.

Note that formation of the composite layer is preferably carried out at not lower than the dew point of the production atmosphere from a viewpoint of preventing adhesion of moisture. For the same reason, it is preferable that a processing machine in which water is used as a cooling medium (or heating medium) is not used in formation of the composite layer.

Since the presently disclosed production method uses a shaping material for an electrode in which the proportion constituted by a compound having an equal or higher volatilization rate than N-methylpyrrolidone is small, the composite layer can be formed without a drying step of drying the shaping material for an electrode, unlike in a production method using a slurry that contains a large amount of a solvent.

In a case in which an electrode that is composed of only the shaping material for an electrode is to be produced, an electrode that is formed of a composite layer can be produced by shaping the shaping material for an electrode into a desired shape such as a sheet shape, for example, and then optionally performing cross-linking or polymerization, but is not specifically limited to being produced in this manner.

Note that in a case in which the shaping material for an electrode is shaped into a sheet shape, it is preferable that a plurality of strands formed of the shaping material for an electrode are squashed to shape the plurality of strands into a sheet shape from a viewpoint of easily obtaining a sheet formed of the shaping material for an electrode and facilitating thinning of the sheet, but this is not a specific limitation. The cross-sectional shape of the strands may be a circle, an ellipse, a triangle, a quadrilateral, or any other polygon, for example. The cross-sectional shape is preferably not a shape having hollows like a star shape from a viewpoint of not causing the formation of pores in the electrode.

In a case in which an electrode having the shaping material for an electrode affixed to the surface of a current collector is to be produced, an electrode that has a composite layer disposed on a current collector can be produced by performing forming of the shaping material for an electrode to a desired shape and subsequently affixing the shaping material for an electrode to one side or both sides of the current collector, but is not specifically limited to being produced in this manner. By forming and subsequently affixing the shaping material for an electrode, the shape of a composite layer that is formed of the shaping material for an electrode and is disposed on the current collector can easily be adjusted to a desired shape. In a case in which forming is performed after affixing to the current collector or in which affixing and forming are performed concurrently, force that is applied and work that is carried out are preferably limited so as not to deform or damage the current collector.

Note that in a case in which the shaping material for an electrode is to be affixed to both sides of the current collector, it is preferable that the shaping material for an electrode is affixed to both sides of the current collector at roughly the same time, and more preferable that the shaping material for an electrode is affixed to both sides of the current collector at the same time.

A step of adjusting the shape and/or thickness of the composite layer is preferably included in a case in which the electrode is produced as described above.

The shape of the composite layer can easily be adjusted through paring of the shaping material for an electrode, for example.

Moreover, the thickness of the composite layer can easily be adjusted through squashing of the shaping material for an electrode using a roll, or the like, or through paring of the shaping material for an electrode, for example.

In a case in which thickness adjustment is performed through squashing of the shaping material for an electrode, the shaping material for an electrode is preferably squashed using a curved surface having a radius of curvature of 100 mm or less from a viewpoint of easily adjusting the thickness. Note that in the squashing, it is easy to obtain an electrode of uniform thickness by performing squashing while controlling the clearance such as to be constant. The curved surface having a radius of curvature of 100 mm or less is preferably a roll shape, and is more preferably rotating. The rotation may be at the same speed relative to the shaping material for an electrode or may have a speed difference in the forward direction or the reverse direction relative to the shaping material for an electrode. By providing a speed difference, it is possible to control at which side the shaping material for an electrode becomes affixed to. In a case in which the shaping material for an electrode is sandwiched between bodies having different speeds, the shaping material for an electrode typically affixes more easily to the body having a higher speed. The thickness is preferably gradually reduced over multiple stages (two or more stages) in the squashing step rather than in one stage because this reduces stress acting on the shaping material for an electrode.

Moreover, in a case in which the thickness accuracy of the shaping material for an electrode is to be controlled with a high degree of accuracy to within ±5%, for example, it is preferable that rough adjustment of thickness is performed and then fine adjustment is performed using a curved surface having a radius of curvature of 0.5 mm or more. By stroking the shaping material for an electrode using a curved surface having a radius of curvature of 0.5 mm or more, the thickness accuracy of the electrode can be improved. When this is performed, the curved surface may be moving, the shaping material for an electrode may be moving, or both the curved surface and the shaping material for an electrode may be moving. Stroking is preferably performed with a constant pressing force, and this pressing force is preferably of a strength that does not change the average thickness of the electrode by 1% or more.

In a case in which a roll is used to perform squashing of the shaping material for an electrode, the surface of the roll is preferably not tacky, and is more preferably formed of a ceramic, a fluoropolymer, a silicone polymer, or a metal. The roll surface may be subjected to treatment for increasing surface roughness such as to provide a satin finish. Treatment of roughening the surface can be performed by sandblasting or the like. Excessive roughening may result in the shaping material for an electrode becoming buried in holes (depressions). Therefore, the height difference of the roughness is preferably 20 μm or less, and the major diameter of the holes is preferably 20 μm or less. Moreover, tape of constant thickness may be affixed to the surface of the roll for thickness control. Furthermore, the surface of the roll may be provided with a pattern, and this pattern may be transferred to the shaping material for an electrode. The roll preferably has a small diameter from a viewpoint of inhibiting volatilization of components from the shaping material for an electrode. Moreover, a surface of the shaping material for an electrode that comes into contact with the roll is preferably provided with a wave shape or irregularities using a known method such as forming or notching, for example, from a viewpoint of preventing the shaping material for an electrode from becoming affixed to the roll. The height difference of the wave shape or irregularities is preferably 1% to 95% of the thickness at a thickest section of the shaping material for an electrode. Forming can be performed by setting the shape of an outlet die of a kneader as a wave shape, for example. By imparting a shape such as described above to the surface of the shaping material for an electrode, the shaping material for an electrode becomes easier to squash, which facilitates thickness control.

In the presently disclosed method of producing an electrode, it is preferable that the thickness of the shaping material for an electrode is measured and feedback control of basis weight of the shaping material for an electrode is performed. Since the proportion constituted by a compound having an equal or higher volatilization rate than N-methylpyrrolidone in the shaping material for an electrode is not less than 0 mass % and not more than 20 mass % and thus the basis weight of the shaping material for an electrode can easily be determined from the thickness thereof, it is easy to control the basis weight by measuring the thickness and performing feedback control of the basis weight. The thickness measurement can easily be performed using a contact-type thickness meter or a laser-type thickness meter.

It should be noted that an electrode produced in accordance with the presently disclosed production method is formed using a shaping material for an electrode that contains an ion conductor having an ion conductivity at a temperature of 5° C. of $10^{-4}$ S/cm or less, and normally does not enable operation of an electrochemical device while in that form. Therefore, in a situation in which the electrode is used in an electrochemical device, the electrode is used once the amount of an ionic material required to enable operation of the electrochemical device has been supplemented into the composite layer in some way or other.

An electrode that has been produced in accordance with the presently disclosed production method is preferably incorporated into an electrochemical device as soon as possible after production. The electrode is preferably incorporated into an electrochemical device within 20 days, more preferably within 10 days, and even more preferably within 5 days.

(Method of Producing Electrochemical Device)

The presently disclosed method of producing an electrochemical device is used in production of an electrochemical device using an electrode produced using the presently disclosed method of producing an electrode for an electrochemical device and is a method that, even when an electrode produced using the presently disclosed production method is used, can provide an electrochemical device that operates well by supplementing ions into a composite layer of the electrode.

The presently disclosed method of producing an electrochemical device includes a step (A) of producing either or both of a positive electrode and a negative electrode using the presently disclosed method of producing an electrode for an electrochemical device and a step (B) of bringing an electrode produced in step (A) and a separator containing an ion source into contact. By bringing the electrode into contact with a separator containing an ion source in step (B)

in this manner, ions can be supplemented into the composite layer of the electrode, thereby making it possible to provide an electrochemical device that operates well.

<Step (A)>

In step (A), either or both of a positive electrode and a negative electrode are produced using the presently disclosed method of producing an electrode for an electrochemical device.

<Step (B)>

In step (B), the electrode produced in step (A) and a separator containing an ion source are brought into contact inside a casing, for example, so as to supplement ions into the composite layer of the electrode from the ion source. Moreover, an electrochemical device that includes a positive electrode, a negative electrode, and a separator, and that optionally further contains an electrolyte solution is obtained. Note that the composite layer of the electrode produced in step (A) can be well supplemented with ions as a result of having a porosity of 10 volume % or less.

In a case in which only one of the positive electrode and the negative electrode is produced using the presently disclosed method of producing an electrode for an electrochemical device in step (A), any counter electrode, such as a metal electrode, can be used as the counter electrode. In particular, it is preferable to use an electrode formed of at least one selected from an alkali metal, an alkaline earth metal, and metal aluminum as the counter electrode. In the presently disclosed production method, an electrode can be produced in an open atmosphere, though this may result in the electrode that has been produced in an open atmosphere containing more moisture than a conventional electrode. However, imported moisture originating from the electrode can be trapped well by using a counter electrode such as described above.

The separator containing an ion source can be any separator that contains an ion source such as an ionic material without any specific limitations. The ionic material can be any of the same ionic materials as given as examples of ionic materials that can be contained in the presently disclosed shaping material for an electrode, but is not specifically limited thereto. The amount of the ion source that is included can be determined from the salt concentration required to enable operation of the electrochemical device.

Any electrolyte solution that is used in an electrochemical device can be used as the electrolyte solution without any specific limitations.

In the electrochemical device produced in accordance with the presently disclosed production method, either or both of the counter electrode and the separator preferably contain an inorganic filler having moisture trapping ability and/or an ionic material having moisture trapping ability. When the counter electrode and/or the separator contain an inorganic filler having moisture trapping ability and/or an ionic material having moisture trapping ability, imported moisture originating from the electrode can be trapped well. Examples of the inorganic filler having moisture trapping ability include, but are not specifically limited to, silica, alumina, magnesium sulfate, calcium sulfate, magnesium oxide, calcium oxide, magnesium hydride, lithium hydride, calcium hydride, and phosphorus pentoxide particles. Examples of the ionic material having moisture trapping ability include, but are not specifically limited to, bis(oxalato)borate salts and difluoro(oxalato)borate salts.

EXAMPLES

The volatilization rates of various compounds were first evaluated by performing Reference Example 1 described below.

Reference Example 1

Inside a dry room controlled to a room temperature of 18° C. and a dew point of −40° C., 1 g of each organic compound indicated in Table 1 was weighed onto an aluminum plate of 5 cm in diameter and was left in a draft controlled to a wind speed of 0.5 m/min without attaching a lid or the like. The weight of the organic compound was measured after 12 hours, and the volatilization rate (=(mass loss/initial mass)× 100%) was evaluated.

The results are shown in Table 1.

TABLE 1

| Compound | Volatilization rate [mass %] |
|---|---|
| Tris(ethylhexyl) phosphate | 0.1 |
| Adiponitrile | 0.3 |
| 1,3-Propane sultone | 0.4 |
| Glutaric anhydride | 0.5 |
| Succinic anhydride | 0.6 |
| Succinonitrile | 0.8 |
| Tributyl phosphate | 1.0 |
| Tetraglyme | 1.0 |
| Diglycolic anhydride | 1.3 |
| Sulfolane | 1.5 |
| Ethyl methyl sulfone | 1.5 |
| Dimethyl sulfone | 1.5 |
| Tris(butoxyethyl) phosphate | 1.6 |
| Sulfolene | 1.6 |
| Diethyl sulfone | 2.5 |
| Ethylene sulfate (1,3,2-dioxathiolane-2,2-dioxide) | 2.8 |
| Vinyl ethylene carbonate | 3.5 |
| Ethylene carbonate | 4.1 |
| N-Methyloxazolidone | 7.3 |
| Propylene carbonate | 7.8 |
| Fluoroethylene carbonate | 11.3 |
| Triglyme | 23.2 |
| Triethyl phosphate | 34.7 |
| Citraconic anhydride | 38.7 |
| Methyl carbamate | 42.1 |
| Dimethylimidazolidinone | 43.1 |
| N-Methylpyrrolidone | 47.5 |
| γ-Butyrolactone | 50.8 |
| Dimethyl oxalate | 62.8 |
| Vinylene carbonate | 66.5 |
| Dimethyl sulfoxide | 66.6 |
| Trimethyl phosphate | 80.0 |
| Dimethyl carbonate | 100.0 |
| Diethyl carbonate | 100.0 |
| Ethyl methyl carbonate | 100.0 |
| Ethyl acetate | 100.0 |
| Ethyl propionate | 100.0 |
| Propyl propionate | 100.0 |

The following examples and comparative examples were then carried out. Note that the following operations were carried out inside a dry room controlled to a dew point of −40° C. or lower.

Example 1

<Production of Negative Electrode>

A twin-screw extruder (L/D=30) that included a kneading section and a vent section and that had a T-die capable of ejection with a sheet shape as an outlet thereof was supplied with ethylene carbonate in a weight ratio of 6, dimethyl sulfone in a weight ratio of 2, an ethylene oxide-propylene oxide copolymer having a molecular weight of 1,000,000 in a weight ratio of 1, PTFE nanofiber as a fiber component in a weight ratio of 1, and graphite as a negative electrode active material in a weight ratio of 50 using a total of 6 screw-type metering feeders. Twin-screw kneading and sheet forming of these materials were performed at room temperature of 25° C. With the clearance of the die outlet set as 100 μm, the material was nipped by rolls of 200 mm in diameter while being sandwiched from both sides by copper foil of 25 μm in thickness as a current collector to continuously obtain a sheet-shaped negative electrode having a thickness of 100 μm and a thickness accuracy of ±3%. With regards to the product temperature during this production process, the temperature at an inlet of the extruder was the same as room temperature (25° C.), the temperature in the hermetically sealed kneading section rose to 50° C. through frictional heat caused by kneading, and the outlet temperature was the same as room temperature (25° C.). Since volatile matter from the material was not completely zero, operation was carried out with local ventilation equipment installed as appropriate from a viewpoint of operator health.

The produced negative electrode sandwiched by copper foil was used as a test specimen for measurement of interface resistance. The change of interface resistance from when the negative electrode was produced is shown in Table 2. Note that measurement of interface resistance described hereinafter was performed using an Impedance Analyzer produced by Solartron Analytical. No increase of resistance after production was observed.

The porosity of the composite layer calculated from the electrode density was 0%. The ion conductivity at a temperature of 5° C. of the ion conductor (chemical composition: ethylene carbonate=6, dimethyl sulfone=2; ethylene oxide-propylene oxide copolymer having molecular weight of 1,000,000=1) used to produce the negative electrode was separately measured and was found to be $10^{-7}$ S/cm or less.

<Production of Positive Electrode>

The same model of twin-screw extruder as used in production of the negative electrode was supplied with ethylene carbonate in a weight ratio of 6, dimethyl sulfone in a weight ratio of 2, an ethylene oxide-propylene oxide copolymer having a molecular weight of 1,000,000 in a weight ratio of 1, PTFE nanofiber as a fiber component in a weight ratio of 1, lithium cobalt oxide as a positive electrode active material in a weight ratio of 100, and acetylene black in a weight ratio of 3 using a total of 6 screw-type metering feeders. Twin-screw kneading and sheet forming of these materials were performed at room temperature of 25° C. With the clearance of the die outlet set as 100 μm, the material was nipped by rolls of 200 mm in diameter while being sandwiched from both sides by aluminum foil of 25 μm in thickness as a current collector to continuously obtain a sheet-shaped positive electrode having a thickness of 100 μm and a thickness accuracy of ±3%. With regards to the product temperature during this production process, the temperature at an inlet of the extruder was the same as room temperature (25° C.), the temperature in the hermetically sealed kneading section rose to 50° C. through frictional heat caused by kneading, and the outlet temperature was the same as room temperature (25° C.). Since volatile matter from the material was not completely zero, operation was carried out with local ventilation equipment installed as appropriate from a viewpoint of operator health.

The produced positive electrode sandwiched by aluminum foil was used as a test specimen for measurement of interface resistance. The change of interface resistance from when the positive electrode was produced is shown in Table 2. No increase of resistance after production was observed.

The porosity of the composite layer calculated from the electrode density was 0%. The ion conductivity at a temperature of 5° C. of the ion conductor (chemical composition: ethylene carbonate=6, dimethyl sulfone=2; ethylene oxide-propylene oxide copolymer having molecular weight of 1,000,000=1) used to produce the positive electrode was separately measured and was found to be $10^{-7}$ S/cm or less.

Comparative Example 1

<Production of Negative Electrode>

A twin-screw extruder (L/D=30) that included a kneading section and a vent section and that had a T-die capable of ejection with a sheet shape as an outlet thereof was supplied with ethylene carbonate in a weight ratio of 5, dimethyl sulfone in a weight ratio of 2, an ethylene oxide-propylene oxide copolymer having a molecular weight of 1,000,000 in a weight ratio of 1, PTFE nanofiber as a fiber component in a weight ratio of 0.5, lithium bis(fluorosulfonyl)imide as an ionic material in a weight ratio of 1, and graphite (604A produced by Nippon Carbon Co., Ltd.) as a negative electrode active material in a weight ratio of 50 using a total of 6 screw-type metering feeders. Twin-screw kneading and sheet forming of these materials were performed at room temperature of 25° C. With the clearance of the die outlet set as 100 μm, the material was nipped by rolls of 200 mm in diameter while being sandwiched from both sides by copper foil of 25 μm in thickness as a current collector to continuously obtain a sheet-shaped negative electrode having a thickness of 100 μm and a thickness accuracy of ±3%.

The produced negative electrode sandwiched by copper foil was used as a test specimen for measurement of interface resistance. The change of interface resistance from when the negative electrode was produced is shown in Table 2. A trend of increasing resistance after production was observed and is thought to be due to corrosion of the current collector foil by a salt (ionic material).

<Production of Positive Electrode>

The same model of twin-screw extruder as used in production of the negative electrode was supplied with ethylene carbonate in a weight ratio of 5, dimethyl sulfone in a weight ratio of 2, an ethylene oxide-propylene oxide copolymer having a molecular weight of 1,000,000 in a weight ratio of 1, PTFE nanofiber as a fiber component in a weight ratio of 1, lithium bis(fluorosulfonyl)imide as an ionic material in a weight ratio of 1, lithium cobalt oxide (CELLSEED C produced by Nippon Chemical Industrial Co., Ltd.) as a positive electrode active material in a weight ratio of 100, and acetylene black in a weight ratio of 3 using a total of 7 screw-type metering feeders. Twin-screw kneading and sheet forming of these materials were performed at room temperature of 25° C. With the clearance of the die outlet set as 100 μm, the material was nipped by rolls of 200 mm in diameter while being sandwiched from both sides by aluminum foil of 25 μm in thickness as a current collector to continuously obtain a sheet-shaped positive electrode having a thickness of 100 μm and a thickness accuracy of ±3%.

The produced positive electrode sandwiched by aluminum foil was used as a test specimen for measurement of interface resistance. The change of interface resistance from when the positive electrode was produced is shown in Table 2. A trend of increasing resistance after production was observed and is thought to be due to corrosion of the current collector foil by a salt (ionic material).

TABLE 2

| | | Interface resistance ($\Omega \cdot cm^2$) | | |
|---|---|---|---|---|
| | | Straight after production | After 1 day | After 4 days |
| Example 1 | Negative electrode | 0.116 | 0.050 | 0.042 |
| | Positive electrode | 684 | 569 | 456 |
| Comparative Example 1 | Negative electrode | 0.09 | 0.14 | 0.16 |
| | Positive electrode | 612 | 907 | 1109 |

Example 2

Positive electrodes and negative electrodes were produced in accordance with Example 1 for 1 year. Thereafter, the equipment was transferred to a warehouse that was a normal temperature and normal humidity environment and was left therein for 6 months, but no formation of rust was observed.

Comparative Example 2

Positive electrodes and negative electrodes were produced in accordance with Comparative Example 1 for 1 year. Thereafter, the equipment was taken out of the dry room and was transferred to a warehouse that was a normal temperature and normal humidity environment. When the equipment was inspected 6 months layer, rust had formed on many metal parts of the equipment.

Example 3

After weighing out 3 g of ethylene carbonate, 3 g of propylene carbonate, 1 g of an ethylene oxide-propylene oxide-allyl glycidyl ether random copolymer (molar ratio=90:5:5) having a molecular weight of 1,000,000, 3 g of LiBF$_4$ as an ionic material, 0.5 g of magnesium oxide (KYOWAMAG® 30 (KYOWAMAG is a registered trademark in Japan, other countries, or both) produced by Kyowa Chemical Industry Co., Ltd.) as a filler having moisture trapping ability, and 50 mg of Irg 651 as a UV cross-linker, these materials were mixed at room temperature to obtain a homogeneous electrolyte composition. The electrolyte composition was kneaded in an open mortar, was sandwiched between two releasable PET films, and was irradiated with UV to produce a cross-linked separator of 100 μm in thickness.

A positive electrode and a negative electrode were produced in the same way as in Example 1 with the exception that a current collector was provided at only one side, and then the separator was sandwiched between the positive electrode and the negative electrode to construct a lithium ion battery. When resistance was measured by a tester in order to evaluate electrical insulation performance of a separator section of the battery, the resistance was at least 50 MΩ. The voltage was also measured but was 0 V. It is thought that as a result of the electrodes produced in accordance with the presently disclosed production method not containing an ionic material as a supporting electrolyte necessary for an electrochemical reaction, an electrochemical reaction did not occur at the electrodes, and insulation resistance could be measured straight after production.

Moreover, when this battery was stored at 25° C. for 3 days and then the voltage was measured, a voltage of approximately 100 mV was generated. When the battery was subsequently connected to a charge/discharge tester, repeated charging and discharging could be performed between 4.2 V and 3 V. This is thought to be a consequence of ionic material diffusing into the electrodes from the separator to thereby place the electrodes in a state in which they can instigate an electrochemical reaction. Once in this state, insulation resistance could no longer be measured.

Example 4

A battery was produced by preparing the same electrodes as in Example 3 and by using Celgard 2325 as a separator. Insulation resistance measured in this state was found to be at least 50 MΩ. Thereafter, an ethylene carbonate/diethyl carbonate (50/50) solution containing 1 M of LiPF$_6$ was injected. When the battery was connected to a charge/discharge tester 3 days later, it was possible to perform repeated charging and discharging between 4.2 V and 3 V.

Comparative Example 3

A separator was produced in the same way as in Example 3.

A positive electrode and a negative electrode were produced in the same way as in Comparative Example 1 with the exception that a current collector was provided at only one side, and then the aforementioned separator was sandwiched between the positive electrode and the negative electrode to construct a lithium ion battery. When resistance was measured by a tester in order to evaluate electrical insulation performance of a separator section of the battery, current from the battery flowed into the tester, and resistance could not be measured.

Example 5

A negative electrode was produced by the same operations as in Example 3 with the exception that ethylene carbonate in a weight ratio of 6 and dimethyl sulfone in a weight ratio of 2 were changed to ethylene carbonate in a weight ratio of 8 and dimethyl carbonate in a weight ratio of 2.

There was harsh odor of dimethyl carbonate in the air during work, and the work environment was unsuitable.

Moreover, although it was possible to produce an electrode, the density of the electrode was lower than designed. This is thought to be due to dimethyl carbonate volatilizing and causing formation of pores.

The porosity calculated from the electrode density was 4.5 volume %.

When a positive electrode was produced by the same method and then a battery was produced in the same way as in Example 3, insulation resistance could be measured and was at least 50 MΩ. The voltage was also measured but was 0 V. When this battery was stored at 25° C. for 3 days and was then connected to a charge/discharge tester, repeated charging and discharging between 4.2 V and 3 V was possible in the same way as in Example 3.

Comparative Example 4

A negative electrode was produced by the same operations as in Example 4 with the exception that ethylene carbonate in a weight ratio of 8 and dimethyl carbonate in a weight ratio of 2 were changed to ethylene carbonate in a weight ratio of 3 and dimethyl carbonate in a weight ratio of 7.

There was harsh odor of dimethyl carbonate in the air during work, and the work environment was unsuitable.

Moreover, although it was possible to produce an electrode, the density of the electrode was lower than designed. This is thought to be due to dimethyl carbonate volatilizing and causing formation of pores.

The porosity calculated from the electrode density was 13 volume %.

When a positive electrode was produced by the same method and then a battery was produced in the same way as in Example 3, insulation resistance could be measured and was at least 50 MΩ. The voltage was also measured but was 0 V. When this battery was stored at 25° C. for 3 days and was then connected to a charge/discharge tester, 4.2 V was reached soon after starting charging, and satisfactory charging was not possible. It is thought that sufficient diffusion of ions from the separator to the electrodes did not occur due to the high porosity.

INDUSTRIAL APPLICABILITY

According to the present disclosure, it is possible to provide a method of producing an electrode for an electrochemical device in which problems of corrosion of production equipment and odor have a low tendency to occur and also to provide a method of producing an electrochemical device using an electrode produced by the aforementioned production method.

Moreover, according to the present disclosure, it is possible to provide a shaping material for an electrode that can inhibit the occurrence of problems of corrosion of production equipment and odor when used to produce an electrode.

The invention claimed is:

1. A method of producing an electrode for an electrochemical device comprising a step of forming an electrode including a composite layer having a porosity of 10 volume % or less using a shaping material for an electrode that contains an active material and an ion conductor having an ion conductivity at a temperature of 5° C. of $10^{-4}$ S/cm or less, wherein a content of the active material in the shaping material for an electrode is 70 volume % or more, the ion conductor includes a low molecular weight organic compound having a molecular weight of less than 10,000, and a proportion constituted by a compound having an equal or higher volatilization rate than N-methylpyrrolidone among the low molecular weight organic compound is not less than 0 mass % and not more than 20 mass % based on the total mass % of the compound.

2. The method of producing an electrode for an electrochemical device according to claim 1, wherein the ion conductor is a viscous composition containing a polymer in a proportion of 50 mass % or less.

3. The method of producing an electrode for an electrochemical device according to claim 1, wherein the ion conductor does not include an ionic material.

4. The method of producing an electrode for an electrochemical device according to claim 1, wherein forming of the shaping material for an electrode is performed to form the composite layer in the step.

5. A method of producing an electrochemical device comprising:

a step (A) of producing either or both of a positive electrode and a negative electrode using the method of producing an electrode for an electrochemical device according to claim 1; and a step (B) of bringing an electrode produced in the step (A) and a separator containing an ion source into contact.

6. A shaping material for an electrode comprising: an active material; and an ion conductor having an ion conductivity at a temperature of 5° C. of $10^{-4}$ S/cm or less, wherein a content of the active material in the shaping material for an electrode is 70 volume % or more, the ion conductor includes a low molecular weight organic compound having a molecular weight of less than 10,000, and a proportion constituted by a compound having an equal or higher volatilization rate than N-methylpyrrolidone among the low molecular weight organic compound is not less than 0 mass % and not more than 20 mass % based on the total mass % of the compound.

7. The shaping material for an electrode according to claim 6, wherein the ion conductor is a viscous composition containing a polymer in a proportion of 50 mass % or less.

8. The shaping material for an electrode according to claim 6, wherein the ion conductor does not include an ionic material.

* * * * *